United States Patent [19]

Rheaume et al.

[11] Patent Number: 4,918,036

[45] Date of Patent: Apr. 17, 1990

[54] CRACKING CATALYST/SULFUR OXIDE GETTERING AGENT COMPOSITIONS

[75] Inventors: Leo A. Rheaume, Hyattsville; Ronald E. Ritter, Ellicott City, both of Md.

[73] Assignee: W. R. Grace & Co.-Conn., New York, N.Y.

[21] Appl. No.: 218,527

[22] Filed: Jul. 7, 1988

Related U.S. Application Data

[60] Continuation of Ser. No. 898,772, Aug. 15, 1986, abandoned, which is a division of Ser. No. 641,211, Aug. 16, 1984, abandoned.

[51] Int. Cl.$^4$ .......................... B01J 27/07; B01J 29/06
[52] U.S. Cl. ........................................ 502/66; 502/68; 502/217
[58] Field of Search ..................... 502/68, 64, 66, 217; 423/244 A

[56] References Cited

U.S. PATENT DOCUMENTS

| | | | |
|---|---|---|---|
| 2,418,851 | 4/1950 | Rosenblatt et al. | 502/217 |
| 3,320,906 | 5/1967 | Domahidy | 423/244 A |
| 3,507,812 | 4/1970 | Smith et al. | 502/68 |
| 3,835,031 | 9/1974 | Bertolacini et al. | 423/244 A |
| 4,153,535 | 5/1979 | Vasalos et al. | 208/120 |
| 4,300,997 | 11/1981 | Meguerian et al. | 502/42 |
| 4,350,615 | 9/1982 | Meguerian et al. | 502/68 |
| 4,428,827 | 1/1984 | Hobbs et al. | 423/244 |
| 4,465,779 | 8/1984 | Occelli et al. | 502/68 |
| 4,485,159 | 11/1984 | Dupin | 502/217 |
| 4,542,118 | 9/1985 | Nozemack et al. | 502/68 |

FOREIGN PATENT DOCUMENTS

| | | | |
|---|---|---|---|
| 0060742 | 9/1982 | European Pat. Off. | 502/217 |
| 68889 | 6/1977 | Japan | 423/244 A |
| 151932 | 11/1979 | Japan | 423/244 A |
| 82/00105 | 1/1982 | World Int. Prop. O. | 502/68 |

OTHER PUBLICATIONS

*The Condensed Chemical Dictionary*, Eighth Edition, Publ.-Van Nostrand Reinhold Co., N.Y., p. 537, "Magnesium Sulfate".

*Primary Examiner*—Carl F. Dees
*Attorney, Agent, or Firm*—Arthur P. Savage

[57] ABSTRACT

Sulfur oxide gettering agents which comprise a metal sulfate, such as magnesium sulfate, are described. These getterin agents are used to reduce sulfur oxide emissions from a variety of processes and units, including fluid catalytic cracking (FCC) units.

7 Claims, No Drawings

CRACKING CATALYST/SULFUR OXIDE GETTERING AGENT COMPOSITIONS

This is a continuation of application Ser. No. 898,772, filed Aug. 15, 1986, which is a division of application Ser. No. 641,211, filed Aug. 16, 1984 (both now abandoned).

The present invention relates to catalysts which are used to catalytically crack hydrocarbons and to sulfur oxide absorbing/gettering agent compositions which may be used to control sulfur oxide emissions.

More specifically, the invention contemplates the preparation and use of catalytic cracking catalysts which are capable of reducing the amount of sulfur oxides ($SO_x$) emitted to the atmosphere during regeneration of the catalyst, and to highly efficient $SO_x$ control agents which may be used to control $SO_x$ emissions from a variety of processes.

Cracking catalysts which are used to crack hydrocarbon feedstocks become relatively inactive due to the deposition of carbonaceus deposits on the catalyst. These carbonaceous deposits are commonly called coke. When the feedstocks contain organic sulfur compounds, the coke on the catalyst contains sulfur. After the cracking step, the catalyst passes to a stripping zone where steam is used to remove strippable hydrocarbons from the catalyst. The catalyst then goes to the regenerator, where the catalyst is regenerated by burning the coke in an oxygen-containing gas. This converts the carbon and hydrogen in the coke to carbon monoxide, carbon dioxide and water. The sulfur in the coke is converted to oxides of sulfur, $SO_2$ and $SO_3$, i.e. $SO_x$.

Generally, the greater the amount of sulfur in the feedstock, the greater the amount of sulfur in the coke. Likewise, the greater the amount of sulfur in the coke, the greater the amount of sulfur oxides in the flue gas exiting from the regenerator. In general, the amount of $SO_2$ and $SO_3$, i.e. $SO_x$, in the flue gas amounts to about 250 to 2,500 parts per million by volume.

The prior art has suggested various methods for removing or preventing the liberation of $SO_x$ to the atmosphere during oxidative combustion of sulfur containing fuels/residues. Typically, FCC/combustion units have been equipped with conventional scrubbers in which the $SO_x$ components are removed from flue gas by absorption/reaction with gettering agents (sometimes referred to as "$SO_x$ acceptors") such as magnesium and/or calcium oxide. In some instances, hydrocarbon feedstocks are pretreated (hydrotreated) to remove sulfur. It has also been claimed that sulfur oxide emissions from FCC units may be controlled by use of a cracking catalyst in combination with a sulfur absorber or gettering agent. It has also been claimed that these sulfur gettering agents are more effective when used in the presence of oxidation catalysts.

Oxidation catalysts are currently being used in FCC units to oxidize CO to $CO_2$ in the catalyst bed during the coke-burning step in the regenerator. The oxidation of CO to $CO_2$ in the catalyst bed yields many benefits. One benefit is the reduction of CO emissions. Another is the avoidance of "after-burning", i.e., the oxidation of CO to $CO_2$ outside the catalyst bed, which results in a loss of heat energy and causes damage to the cyclones and flue gas exit lines. The major benefit in using oxidation catalysts to oxidize CO to $CO_2$ in the catalyst regenerator bed derives from the heat released when the CO is oxidized to $CO_2$. This heat raises the catalyst bed temperature and thereby increases the coke-burning rate. This gives a lower residual carbon level on regenerated catalyst (CRC). This, in turn, makes the regenerated catalyst more active for the cracking step. This increases the amount of useful products produced in the FCC unit.

In view of the fact that CO oxidation catalysts are currently being used in many FCC units for economic reasons, $SO_x$ gettering agents for use in FCC units must be compatible and effective in the presence of oxidation catalysts. Furthermore, $SO_x$ gettering agents for use in FCC units must be effective under the actual conditions seen in FCC units, such as temperatures of 800°–1050° F. and catalyst residence times of 3 to 15 seconds in the reducing atmosphere of the reactor, temperatures of 800°–1050° F. in the steam atmosphere of the stripper, temperatures of 1150°–1550° F. and catalyst residence times of 5 to 15 minutes in the oxidizing atmosphere of the regenerator. Additionally, $SO_x$ gettering agents for use in FCC units must be effective in the presence of the materials present in FCC units, such as cracking catalysts of various compositions, oil feedstocks of various compositions and their cracked products, and, as stated earlier, oxidation catalysts to oxidize CO to $CO_2$.

The following patents disclose the use of cracking catalysts which contain various sulfur and carbon monoxide emission control agents.

| U.S Pat No. 3,542,670 |
|---|
| 3,699,037 |
| 3,835,031 |
| 4,071,436 |
| 4,115,249 |
| 4,115,250 |
| 4,115,251 |
| 4,137,151 |
| 4,146,463 |
| 4,151,119 |
| 4,152,298 |
| 4,153,535 |
| 4,166,787 |
| 4,182,693 |
| 4,187,199 |
| 4,200,520 |
| 4,206,039 |
| 4,206,085 |
| 4,221,677 |
| 4,238,317 |
| 4,240,899 |
| 4,267,072 |
| 4,300,997 |
| 4,325,811 |
| 4,369,108 |
| 4,369,130 |
| 4,376,103 |
| 4,376,696 |
| Canadian 1,110,567 |

As shown in the above noted reference, organic sulfur present during regeneration of the cracking catalyst is ultimately oxidized to sulfur trioxide ($SO_3$) which reacts with a gettering agent to form a stable sulfate which is retained in the catalyst inventory of the FCC unit. Regenerated catalyst containing the sulfate compound is recycled to the cracking zone where the catalyst is mixed with oil and steam dispersant to effect the cracking reaction and conversion of the oil to useful products (gasoline, light olefins, etc.).

When the sulfate-containing catalyst is exposed to the reducing and hydrolyzing conditions present during the cracking step and the subsequent hydrolyzing conditions present in the steam stripper, the sulfate is reduced and hydrolyzed to form hydrogen sulfide ($H_2S$) and restore or regenerate the gettering agent. The hydrogen sulfide is recovered as a component of the cracked product stream. The gettering agent is recycled to the regenerator to repeat the process. Through use of catalysts containing appropriate gettering agents, it is disclosed that the amount of sulfur oxides emitted from the regenerator may be significantly reduced.

However, it has been found that attempts to produce $SO_x$-control cracking catalysts which can consistently achieve significant sulfur oxide emission reduction at reasonable cost over long periods of time have in general been unsuccessful.

Accordingly, it is an object of the present invention to provide cracking catalyst compositions which effectively and economically reduces the emission of sulfur oxides from FCC units.

It is another object to provide sulfur oxide gettering agents which are capable of removing sulfur oxides over a long period of time when subjected to multiple gettering/regeneration cycles.

It is a further object to provide $SO_x$ control additives which may be added to the catalyst inventory of an FCC unit in amounts necessary to reduce sulfur oxide regenerator stack gas emissions to an acceptable level.

It is still a further object to provide highly effective sulfur oxide gettering agents which may be advantageously combined with conventional cracking catalyst compositions or used to control $SO_x$ emissions from a variety of processes.

These and still further objects will become apparent to one skilled in the art from the following detailed description and specific examples.

Broadly, our invention contemplates catalytic cracking catalyst compositions which include metal sulfates, such as magnesium sulfate, as $SO_x$ gettering agents. Furthermore, our invention contemplates an improved $SO_x$ gettering agent which preferably comprises a particulate magnesium sulfate, or magnesium sulfate combined with an appropriate binder or support such as alumina. These gettering agents may be effectively combined with, or included in, particulate catalyst compositions used for the catalytic cracking of hydrocarbons, or alternatively the gettering agents may be used in any combustion process which generates $SO_x$ components that are to be selectively removed from the combustion products.

More specifically, we have found that a particularly effective $SO_x$ absorber/gettering agent composition suitable for use with catalytic cracking catalyst may be obtained by preparing a metal sulfate, which is stable at temperatures of up to about 1550° F., such as magnesium sulfate, in suitable particulate form such as by combining a magnesium sulfatae solution with a porous particulate alumina substrate.

In one preferred practice of the invention, sulfates of Group IIA metals, and in particular $MgSO_4$, $CaSO_4$ and $BaSO_4$, are prepared in appropriate particulate form such as by crushing or grinding solid metal sulfate and separating particles of desired size which comprise essentially pure metal sulfate.

In another preferred practice of the invention we find that the desired result is achieved by combining about 1 to 60 percent by weight $MgSO_4$ with an alumina substrate which has a surface area of from about 45 to 450 $m^2/g$.

In still another preferred embodiment finely divided $MgSO_4$ is combined with suitable binders and/or supports such as alumina sol, silical sol, silica-alumina sol, alumina gel, silica gel, silica-alumina gel, and clays in natural or chemically and/or thermally modified form and formed into particles of desired shape and size.

Alumina substrates are preferred and are available from many commerical sources, and comprise the alumina hydrates, such as alpha alumina monohydrate, alpha alumina trihydrate, beta alumina monohydrate and beta alumina trihydrate. Also considered most suitable are the calcined versions of the above alumina hydrates. These include gamma alumina, chi alumina, eta alumina, kappa alumina, delta alumina, theta alumina, alpha alumina and mixtures thereof.

We have found that $MgSO_4$ is particularly very effective in reducing $SO_x$ emissions from cat-cracking units. The $MgSO_4$ can be used by itself, or it can be supported on a carrier. Any carrier can be used. And that carrier can be loaded with as much $MgSO_4$ as it will take. An example of such a carrier is aluminum oxide. The $MgSO_4$ can also be intimately mixed with another material or materials to form discreet particles. An example is a spray-dried product of $MgSO_4$ and $Al_2O_3$.

The active material is the $MgSO_4$. The use of a carrier for the $MgSO_4$ merely facilitates the use of the $MgSO_4$ for reducing $SO_x$ emissions. $MgSO_4$ by itself, or in combination with a carrier, can be used directly as an additive, i.e., physically mixed with the cracking catalyst. It can also be incorporated on or within the cracking catalyst particle. $MgSO_4$ when used by itself, can be added as $MgSO_4 \cdot 7H_2O$, the usual commerical form of $MgSO_4$. We have also found the $MgSO_4$ be itself, and combinations of $MgSO_4$ and $Al_2O_3$, are superior to MgO and combinations of MgO and $Al_2O_3$, in reducing $SO_x$ emissions. We have tested samples of MgO obtained from different sources, and none is as good as $MgSO_4$.

A possible explanation for the superiority of stable metal sulfates is that, in a cat-cracking unit, some of the original sulfur is removed from the surface of the metal sulfate. This leaves sites expressly tailored to accept $SO_x$ molecules. This can be seen as a memory effect. These sites will accept (capture) $SO_x$ molecules in the regenerator of the cat-cracking unit, and release them, as $H_2S$, in the reactor-stripper of the unit. After releasing the $SO_x$ molecules, as $H_2S$, the sites are now free to again accept (capture) $SO_x$ molecules in the regenerator and release them in the reactor-stripper. These sites will then continue to repeat the cycle, i.e., accept (capture) $SO_x$ molecules in the regenerator, and release them, as $H_2S$, in the reactor-stripper.

The fact that $MgSO_4$ is more effective than MgO means that the sites formed on the surface of the $MgSO_4$ differ from the sites present on MgO.

An additional novel feature of this invention is that all sulfate compounds, stable at regenerator temperatures of 1150°-1550° F., would appear to be effective in some degree in reducing $SO_x$ emissions. However, we have found that $MgSO_4$ is far more effective than closely related compounds such as $CaSO_4$ and $BaSO_4$ which never-the-less may be used separately or combined with $MgSO_4$ if desired. This also applies to all combinations of stable metal sulfate compounds with any other material or materials.

Although intended for use in FCC units, the materials of this invention can be used to reduce $SO_x$ emissions from any operation. An example would be the reduction of $SO_x$ emissions from the flue gas of coal-burning units. In this case, the materials, after capturing $SO_x$, would be rejuvenated by introducing a reducing gas or a reducing gas and steam. The H₂S produced would be absorbed using conventional techniques.

As indicated above, we have found that MgSO₄ with carriers are very effective in reducing SO$_x$ emissions from cat-cracker regenerators. This is not limited to MgSO₄ but would apply to all stable sulfate compounds and to all combinations of sulfate compounds with MgSO₄. The amount of sulfate compound which could be used to reduce SO$_x$ emissions from an FCC unit could range from 0.001% to 50% by weight of the unit cracking catalyst inventory.

To prepare our novel SO$_x$ gettering agent, a solid form of the stable metal sulfate may be crushed, sized and dried to obtain a particulate composition which comprises essentially 100 percent metal sulfate. Alternatively, an alumina substrate is admixed with a quantity of metal sulfate salt solution which will provide the desired amount of sulfate on the surface. Typically, MgSO₄·7H₂O is dissolved in water to provide a desired volume of solution which has the desired concentration of the salt. The alumina substrate is then impregnated with the salt solution to give the desired amount of MgSO₄ on the alumina. The impregnated alumina is then dried at a temperature of 250° F. to 1250° F. While it is contemplated that calcination temperatures of up to about 1500° F. may be used, calcination temperatures on the order of 1000° F. have been found to be satisfactory or calcination may be omitted.

In one preferred embodiment of the invention, the alumina substrate to be impregnated is in the form of microspheroidal particles, with about 90 percent of the particles having diameters in the 20 to 149 micron fluidizable size range. The gettering agent prepared using these microspheroidal particles may be advantageously physically mixed with FCC catalysts in amounts ranging from about 0.5 to 60 percent by weight of the overall composition.

In another preferred embodiment of the invention, the alumina substrate to be impreganted is in the form of particles which have an average particle size of less than 20 microns in diameter, and preferably less than 10 microns in diameter. The finished gettering agent prepared using these fine particles may be incorporated in a cracking catalyst composition during the formation of the catalyst particles.

In another embodiment of the invention, the alumina substrate to be impregnated is in the form of particles one millimeter or greater in diameter. The finished gettering agent prepared using these particles can be used in either a fixed-bed or moving-bed configuration to reduce SO$_x$ emissions from a variety of processes.

Therefore, it is seen that the present gettering agent may be used as a separate additive which is added to the catalyst as a separate particulate component, or incorporated in the catalyst particle during its preparation. Additionally, the gettering agent may be used by itself to reduce SO$_x$ emissions from a variety of processes.

Cracking catalysts which may be advantageously combined with the SO$_x$ gettering agent of the present invention are commercially available compositions and typically comprise crystalline zeolites admixed with inorganic oxide binders and clay. Typically, these catalysts comprise from about 5 to 50 percent by weight crystalline aluminosilicate zeolite in combination with a silica, silica-alumina, or alumina hydrogel or sol binder and optionally from about 10 to 80 percent by weight clay. Zeolites typically used in the preparation of cracking catalysts are stabilized type Y zeolites, i.e. Ultrastable (US) and calcined rare earth exchanged zeolite (CREY), the preparation of which is disclosed in U.S. Pat. Nos. 3,293,192, 3,375,065, 3,402,996, 3,449,070 and 3,595,611. Preparation of catalyst compositions which may be used in the practice of our invention are typically disclosed in U.S. Pat. Nos. 3,957,689, 3,867,308, 3,912,611 and Canadian Pat. No. 967,136.

In a preferred practice of the invention, the cracking catalyst gettering composition will be used in combination with a noble metal oxidation catalyst such as platinum and/or palladium.

In another preferred practice of the invention, the SO$_x$ gettering agent is combined with a cracking catalyst which comprises an alumina sol, i.e. aluminum chlorhydroxide solution, bound zeolite/clay composition as disclosed in Canadian Pat. No. 967,136 admixed with a particulate platinum containing oxidation catalyst to obtain a composition which comprises 0.5 to 60 percent by weight gettering agent, 40 to 99 percent by weight cracking catalyst, and 1 to 5 parts per million platinum.

In still another preferred practice of the invention, the SO$_x$ gettering agent is combined with a zeolite cracking catalyst which possesses an essentially silica-free matrix. These catalysts are obtained by using the procedure set forth in Canadian Pat. No. 967,136 by mixing together the following materials: 5 to 50 weight percent zeolite, 10 to 80 weight percent alumina hydrate (dry basis), and 5 to 40 weight percent aluminum chlorhydroxide sol (Al₂O₃), and water. The mixture was spray-dried to obtain a finely divided catalyst composite and then calcined at a temperature of about 1000° F. The SO$_x$ gettering agent may be included as a component in the spray dried slurry in lieu of some of the alumina hydrate or the SO$_x$ gettering agent may be physically blended with the catalyst in the amount of about 0.1 to 60 weight percent.

As indicated above, the gettering agent may be utilized in the form of a separate particulate additive which is physically blended with a particulate catalyst or the gettering agent may be incorporated in the catalyst particle by admixing the additive with the catalyst components prior to forming of the catalyst. In addition it is contemplated that the gettering agent may be utilized in any combustion/reaction process where it is desirable to collect or remove sulfur oxides from a product gas stream. Typically, the SO$_x$ gettering agent may be used in a fluidized coal combustion process to remove SO$_x$ formed during burning of the coal. The SO$_x$ gettering agent may then be removed from the combustion/reaction zone periodically or continuously to restore or regenerate the gettering agent by subjecting it to reduction-hydrolysis in the presence of hydrogen or carbon monoxide-hydrogen reducing gas mixtures (i.e. syn-gas) and H₂O. Using this technique, the SO$_x$ component of the combustion products is selectively removed as a stable sulfate, and the sulfate is subsequently reduced-hydrolyzed to liberate H₂S and restore or regenerate the gettering agent. The H₂S may be recovered using conventional adsorbing techniques.

To determine the SO$_x$ sorbtion/desorbtion effectiveness of the FCC compositions of the present invention, the compositions were steam-deactivated at 1350° F., 100% steam, 15 psig, for 8 hours. After steam deactivation, the blends were tested in the SO$_x$ Index Test described as follows.

In a lab-scale test unit, a low sulfur gas oil was cracked over the catalyst or catalyst mixture at a temperature of 980° F. The catalyst or catalyst mixture was then steam-stripped at 980° F. Regeneration of the catalyst or catalyst mixture, i.e., the coke-burning regenerator step, was carried out with air at temperatures ranging from 1250° F. to 1450° F. The air used for the coke-burning step contained 2000 ppm $SO_2$. This is equivalent to the amount of $SO_2$ which would be formed in the regenerator if a high sulfur gas oil had been used for the cracking step. The regenerated catalyst or catalyst mixture was then subjected to the cracking and steam-stripping steps to release, as $H_2S$, the $SO_x$ captured in the regenerator. The regeneration and the cracking and stream-stripping steps were repeated. During this second cycle, a portion of the catalyst or catalyst mixture was removed after the regeneration step, and another portion of the catalyst or catalyst mixture was removed after the cracking and steam-stripping steps.

An $SO_x$ Index which gives a measure of the $SO_x$ captured in the regenerator and released in the reactor and stripper was defined as $$SO_x \text{ Index} = \left[ \begin{pmatrix} \text{wt. \% sulfur} \\ \text{content of the} \\ \text{catalyst or} \\ \text{catalyst} \\ \text{mixture after} \\ \text{the re-} \\ \text{generation} \\ \text{step.} \end{pmatrix} - \begin{pmatrix} \text{wt. \% sulfur} \\ \text{content of the} \\ \text{catalyst or} \\ \text{catalyst mixture} \\ \text{after the cracking} \\ \text{and steam-} \\ \text{stripping steps.} \end{pmatrix} \right] \times 1000$$

The $SO_x$ Index Test measures the ability of a catalyst or catalyst mixture to reduce $SO_x$ emissions from a cat-cracker regenerator. The result is expressed as an $SO_x$ Index, with a range of 0 to 115. An $SO_x$ Index of 0 means that the sample does not reduce $SO_x$ emissions. An $SO_x$ index of 115 means essentially 100% reduction of $SO_x$ emissions. Generally, $SO_x$ indices of 91 to 115 are expressed as "above 90". Specifically, the $SO_x$ Index measures the amount of $SO_x$ captured in a catalytic cracking regenerator and released in the reactor and stripper.

Having described the basis aspects of our invention, the following examples are given to illustrate specific embodiments thereof.

EXAMPLE 1

A commerical alpha-alumina monohydrate, which has a particle size in the fluidizable range, was screened to obtain the 38–180 micron size (diameter) fraction. This fraction amounted to 85 percent of the total sample. The 38–180 micron particle size fraction was calcined, in air, for 15 minutes at 900° F. and for 1 hour at 1250° F.

EXAMPLE 2

Reagent grade magnesium sulfate heptahydrate, $MgSO_4 \cdot 7H_2O$, was calcined in air for 30 minutes at 1250° F. The calcined material was crushed to give particles in the 45 to 250 micron range. The composition of the final product was 100% $MgSO_4$. The product is referred to as an additive.

EXAMPLE 3

27.0 g of the calcined alumina ($Al_2O_3$) of Example 1 was impregnated with 12 ml of an aqueous solution of $MgSO_4 \cdot 7H_2O$ which contained 3.0 g of $MgSO_4$. The impregnated $Al_2O_3$ was then calcined for 30 minutes at 1250° F. The composition of the resultant "$MgSO_4$ on $Al_2O_3$" product was 10% $MgSO_4$-90% $Al_2O_3$. This product will be referred to as an additive comprising 10% $MgSO_4$ on $Al_2O_3$.

EXAMPLE 4

22.5 g of the calcined $Al_2O_3$ of Example 1 was give a double impregnation. The first impregnation was with 11 ml of an aqueous solution of $MgSO_4 \cdot 7H_2O$ which contained 3.75 g of $MgSO_4$. After this first impregnation, the sample was dried for 1 hour at 250° F. in a forced-draft oven. After cooling to room temperature, the sample was given a second impregnation with 11 ml of an aqueous solution of $MgSO_4 \cdot 7H_2O$ which contained 3.75 g of $MgSO_4$. Following the second impregnation, the sample was dried for 1 hour at 250° F. in a forced-draft oven. The composition of the resultant "$MgSO_4$ on $Al_2O_3$" product was 25% $MgSO_4$-75% $Al_2O_3$. This product will be referred to as an additive comprising 25% $MgSO_4$ on $Al_2O_3$.

EXAMPLE 5

The procedure of Example 4 was repeated except that, after each impregnation, the sample was dried for 1 hour at 400° F. in a forced-draft oven.

EXAMPLE 6

The procedure of Example 4 was repeated except that, after each impregnation, the sample was dried for 1 hour at 575° F. in a forced-draft oven.

EXAMPLE 7

The procedure of Example 4 was repeated except that, after each impregnation, the sample was calcined in air for 30 minutes at 1000° F.

EXAMPLE 8

The procedure of Example 4 was repeated except that, after each impregnation, the sample was calcined in air for 30 minutes at 1100° F.

EXAMPLE 9

The procedure of Example 4 was repeated except that, after each impregnation, the sample was calcined in air for 30 minutes at 1250° F.

EXAMPLE 10

19.5 g of the calcined $Al_2O_3$ of Example 1 was given a triple impregnation. The first impregnation was with 10 ml of an aqueous solution of $MgSO_4 \cdot 7H_2O$ which contained 3.50 g of $MgSO_4$. After this first impregnation, the sample was calcined in air for 30 minutes at 1250° F. After cooling to room temperature, the sample was given a second impregnation and calcination similar to the first one. Again, after cooling to room temperature, the sample was given a third impregnation and calcination similar to the first one. The composition of the resultant "$MgSO_4$ on $Al_2O_3$" product was 35% $MgSO_4$-65% $Al_2O_3$. This product was called an additive. It will be referred to as 35% $MgSO_4$ on $Al_2O_3$.

EXAMPLE 11

An aqueous solution was prepared which contained $MgSO_4$ and aluminum chlorhydroxide, the latter component having the approximate formula $Al_2(OH)_5Cl$. The concentrations of the two components were set to give a $MgSO_4$ to $Al_2O_3$ ratio of 1 to 19. This solution was spray-dried to give a solid microspheroidal product. This spray-dried product was calcined in air for 1 hour at 1250° F. The composition of the final product was essentially 5% $MgSO_4$-95% $Al_2O_3$. This product will be referred to as an additive comprising 5% $MgSO_4$-95% $Al_2O_3$.

EXAMPLE 12

An aqueous solution was prepared which contained $MgSO_4$ and aluminum chlorhydroxide, the latter component having the approximate formula $Al_2(OH)_5Cl$. The concentrations of the two components were set to give a $MgSO_4$ to $Al_2O_3$ ratio of 1 to 9. This solutoin was spray-dried to give a solid microspheroidal product. This spray-dried product was calcined in air for 1 hour at 1250° F. The composition of the final product was essentially 10% $MgSO_4$-90% $Al_2O_3$. This product will be referred to as an additive comprising 10% $MgSO_4$-90% $Al_2O_3$.

EXAMPLE 13

29.25 g of the calcined $Al_2O_3$ of Example 1 was given a double impregnation. The first impregnation was with 10 ml of an aqueous solution of $Mg(NO_3)_2 \cdot 6H_2O$ which contained 0.75 g of magnesium, expressed as MgO. After this first impregnation, the sample was calcined for 30 minutes at 1000° F. After cooling to room temperature, the sample was given a second impregnation with 10 ml of an aqueous solutoin of $Mg(NO_3)_2 \cdot 6H_2O$ which contained 0.75 g of magnesium, expressed as MgO. Following the second impregnation the sample was calcined in air for 30 minutes at 1000° F. The composition of the resultant "MgO on $Al_2O_3$" product was 4.9% MgO-95.1% $Al_2O_3$. This product will be referred to as an additive comprising 4.9% mGO, ex nitrate, on $Al_2O_3$.

EXAMPLE 14

27.0 g of the calcined $Al_2O_3$ of Example 1 was given a triple impregnation. The first impregnation was with 11 ml of an aqueous solution of $Mg(NO_3)_2 \cdot 6H_2O$ which contained 1.0 g of magnesium, expressed as MgO. After this first impregnation, the sample was calcined in air for 30 minutes at 1000° F. After cooling to room temperature, the sample was given a second impregnation with 11 ml of an aqueous solution of $Mg(NO_3)_2 \cdot 6H_2O$ which contained 1.0 g of magnesium, expressed as MgO. After this second impregnation, the sample was calcined in air for 30 minutes at 1000° F. After cooling to room temperature, the sample was given a third impregnation with 11 ml of an aqueous solution of $Mg(NO_3)_2 \cdot 6H_2O$ which contained 1.0 g of magnesium, expressed as MgO. After this third impregnation, the sample was calcined in air for 30 minutes at 1000° F. The composition of the resultant "MgO on $Al_2O_3$" was 10% MgO-90% $Al_2O_3$. This product will be referred to as an additive comprising MgO, ex nitrate, on $Al_2O_3$.

EXAMPLE 15

27.0 g of the calcined $Al_2O_3$ of Example 1 was given a double impregnation. The first impregnation was with 13 ml of an aqueous solution of $MgCl_2 \cdot 6H_2O$ which contained 1.5 g of magnesium, expressed as MgO. After this first impregnation, the sample was calcined for 30 minutes at 1250° F. After cooling to room temperature, the sample was given a second impregnation with 13 ml of an aqueous solution $MgCl_2 \cdot 6H_2 O$ which contained 1.5 g of magnesium, expressed as mgO. After this second impregnation, the sample was calcined for 30 minutes at 1250° F. The composition of the resultant "MgO on $Al_2O_3$" product was 10% MgO-90% $Al_2O_3$. This product will be referred to as an additive comprising 10% MgO, ex chloride, on $Al_2O_3$.

EXAMPLE 16

24.0 g of the calcined $Al_2O_3$ of Example 1 was given a triple impregnation. The first impregnation was with 11 ml of an aqueous solution of $MgCl_2 \cdot 6H_2O$ which contained 2.0 g of magnesium, expressed as MgO. The impregnated sample was calcined for 30 minutes at 1250° F. After cooling to room temperature, the sample was given a second impregnation and calcination similar to the first one. After cooling to room temperature, the sample was given a third impregnation and calcination similar to the first one. The composition of the resultant "MgO on $Al_2O_3$" product was 20% MgO-80% $Al_2O_3$. This product will be referred to as an additive comprising 20% MgO, ex chloride, on $Al_2O_3$.

EXAMPLE 17

A commercial product called Magchem 40 was obtained which comprised a high purity technical grade of magnesium oxide processed from magnesium-rich brine. Its typical compositoin is given as 98.0% MgO, 0.8% CaO, 0.30% $SiO_2$, 0.20% $Fe_2O_3$, 0.35% other oxides, 0.40% Cl. For purpose of the present examples, this material will be referred to as an additive comprising Magchem 40, 98% MgO.

EXAMPLE 18

A sample of reagent grade $CaSO_4 \cdot 2H_2O$, was heat-treated for 1 hour at 1500° F. It lost 21.53% of its weight. The 21.53% weight loss means that 1.274 g of $CaSo_4 \cdot 2H_2O$ are equivalent to 1.000 g of $CaSO_4$. $CaSO_4 \cdot 2H_2O$ was used as an additive, expressed as $CaSO_4$. It will be referred to as 100% $CaSO_4 \cdot 2H_2O$ as $CaSO_4$.

EXAMPLE 18-2

A sample of reagent grade $BaSO_4$ was used as an additive. It will be referred to as 100% $BaSO_4$.

EXAMPLE 19

DA-250, a commercial cracking catalyst, was blended with CP-3 Combustion Promoter TM (both manufactured by the Davison Chemical Division of W. R. Grace & Co.), to give the blend composition listed as Item A in Table I.

The calcined $Al_2O_3$ of Example 1 and the additives of Examples 2 through 4, and 9 through 18-2, were separately blended with DA-250 and CP-3 to give the blend compositions listed as Items B through R in Table I, and as Items A through D in Table II.

TABLE I

| Item | Additive | Blend Composition Cracking Catalyst | Combustion Promoter | SOx Index |
|---|---|---|---|---|
| A | None | 99.63% DA-250 | 0.37% CP-3 | 10 |
| B | 10% $Al_2O_3$ of Ex. 1 (100% $Al_2O_3$) | 89.63% DA-250 | 0.37% CP-3 | 18 |
| C | 1.25% Additive of Ex. 2 (100% $MgSO_4$) | 98.38% DA-250 | 0.37% CP-3 | 49 |
| C-2 | 2% Additive of Ex. 2 (100% $MgSO_4$) | 97.63 DA-250 | 0.37% CP-3 | above 90 |
| D | 5% Additive of Ex. 3 (10% $MgSO_4$ on $Al_2O_3$) | 94.63% DA-250 | 0.37% CP-3 | — |
| E | 5% Additive of Ex. 9 (25% $MgSO_4$ on $Al_2O_3$) | 94.63% DA-250 | 0.37% CP-3 | 48 |
| F | 5% Additive of Ex. 10 (35% $MgSO_4$ on $Al_2O_3$) | 94.63% DA-250 | 0.37% CP-3 | 70 |
| G | 10% Additive of Ex. 3 (10% $MgSO_4$ on $Al_2O_3$) | 89.63% DA-250 | 0.37% CP-3 | 58 |
| H | 10% Additive of Ex. 9 (25% $MgSO_4$ on $Al_2O_3$) | 89.63% DA-250 | 0.37% CP-3 | above 90 |
| I | 10% Additive of Ex. 10 (35% $MgSO_4$ on $Al_2O_3$) | 89.63% DA-250 | 0.37% CP-3 | — |
| J | 10% Additive of Ex. 11 (5% $MgSO_4$—95% $Al_2O_3$) | 89.63% DA-250 | 0.37% CP-3 | 38 |
| K | 10% Additive of Ex. 12 (10% $MgSO_4$—90% $Al_2O_3$) | 89.63% DA-250 | 0.37% CP-3 | 58 |
| L | 10% Additive of Ex. 13 (4.9% MgO, ex-nitrate, on $Al_2O_3$) | 89.63% DA-250 | 0.37% CP-3 | 26 |
| M | 10% Additive of Ex. 14 (10% MgO ex-nitrate, on $Al_2O_3$) | 89.63% DA-250 | 0.37% CP-3 | 36 |
| N | 10% Additive of Ex. 15 (10% MgO, ex-chloride, on $Al_2O_3$) | 89.63% DA-250 | 0.37% CP-3 | 37 |
| O | 10% Additive of Ex. 16 (20% MgO, ex-chloride on $Al_2O_3$) | 89.63% DA-250 | 0.37% CP-3 | 29 |
| P | 10% Additive of Ex. 17 (Magchem 40, 98% MgO) | 89.63% DA-250 | 0.37% CP-3 | 0 |
| Q | 2% Additive of Ex. 18 (100% $CaSO_4.2H_2O$ as $CaSO_4$) | 97.63% DA-250 | 0.37% CP-3 | 17 |
| R | 2% Additive of Ex. 18-2 (100% $BaSO_4$) | 97.63% DA-250 | 0.37% CP-3 | 17 |

EXAMPLE 20

The blends listed in Tables I and II were steam-deactivated at 1350° F., 100% steam, 15 psig, for 8 hours.

After steam deactivation, the blends were tested in the $SO_x$ Index Test, at a regenerator temperature of 1250° F., to determine the $SO_x$ Index of each blend.

The $SO_x$ Indices for the blends listed in Tables I and II are also included in Tables I and II.

Item A of Table I shows that a blend, without an additive, has an $SO_x$ Index of 10. Item C of Table I shows that a blend containing 1.25% of the Additive of Example 2 (100% $MgSO_4$) has an $SO_x$ Index of 49. Item C-2 of Table I shows that a blend containing 2% of the Additive of Example 2 (100% $MgSO_4$) has an $SO_x$ Index of greater than 90. This shows that $MgSO_4$ is effective in reducing $SO_x$ emissions. It also shows that increasing the concentration of $MgSO_4$ in the blend increases the $SO_x$ Index and hence the ability to reduce $SO_x$ emissions.

Item E of Table I shows that a blend containing 5% of the Additive of Example 9 (25% $MgSO_4$ on $Al_2O_3$) has an $SO_x$ Index of 48. When compared to Item C of Table I, this shows that $MgSO_4$ on $Al_2O_3$ is also effective in reducing $SO_x$ emissions. In this comparison, the amount of $MgSO_4$ in the blends is the same in both cases, namely, 1.25% $MgSO_4$.

Item B to Table I shows that a blend containing 10% $Al_2O_3$ of Example 1 (100% $Al_2O_3$) has an $SO_x$ Index of 18. Item G of Table I shows that a blend containing 10% of the Additive of Example 3 (10% $MgSO_4$ on $Al_2O_3$) has a Davison $SO_x$ Index of 58. This shows that the presence of $MgSO_4$ on the $Al_2O_3$ gives an additive that is more effective, in reducing $SO_x$ emissions, than $Al_2O_3$ without the added $MgSO_4$.

Item E of Table I shows that a blend containing 5% of the Additive of Example 9 (25% $MgSO_4$ on $Al_2O_3$) has an $SO_x$ Index of 48. Item F of Table I shows that a blend containing 5% of the Additive of Example 10 (35% $MgSO_4$ on $Al_2O_3$) has a Index of 70. This shows that increasing the concentration of $MgSO_4$ on the $Al_2O_3$ from 25% $MgSO_4$ to 35% $MgSO_4$ increases the $SO_x$ Index and hence the ability to reduce $SO_x$ emissions.

Item G of Table I shows that a blend containing 10% of the Additive of Example 3 (10% $MgSO_4$ on $Al_2O_3$) has an $SO_x$ Index of 58. Item H of Table I shows that a blend containing 10% of the Additive of Example 9 (25% $MgSO_4$ on $Al_2O_3$) has an $SO_x$ Index of greater than 90. This shows that increasing the concentration of $MgSO_4$ on the $Al_2O_3$ from 10% $MgSO_4$ to 25% $MgSO_4$ increases the $SO_x$ Index and hence the ability to reduce $SO_x$ emissions.

In concert, Items D through I of Table I, show that increasing the $MgSO_4$ concentration on the $Al_2O_3$ from 10% MgSO$_4$ to 35% MgSO$_4$ increases the SO$_x$ Index and hence the ability to reduce SO$_x$ emissions.

Item E of Table I shows that 5% of the Additive of Example 9 (25% MgSO$_4$ on Al$_2$O$_3$) has an SO$_x$ Index of 48. Item H of Table I shows that 10% of the Additive of Example 9 (25% MgSO$_4$ on Al$_2$O$_3$) has a SO$_x$ Index of greater than 90. This shows that increasing the concentration of the Additive in the blend increases the SO$_x$ Index and hence the ability to reduce SO$_x$ emissions.

Item K of Table I shows that a blend containing 10% of the Additive of Example 12 (10% MgSO$_4$-90% Al$_2$O$_3$) has an SO$_x$ Index of 58. This additive was prepared by spray drying an aqueous solution of MgSO$_4$ and aluminum chlorhydroxide, followed by a calcination. It has the same SO$_x$ Index as the Additive of Example 3 (10% MgSO$_4$ on Al$_2$O$_3$) (Item G of Table I), which was prepared by impregnation of Al$_2$O$_3$ with MgSO$_4$, followed by a calcination. This shows that a spray-dried solid product of MgSO$_4$ and Al$_2$O$_3$ has the same effectiveness as MgSO$_4$ on Al$_2$O$_3$.

Item J of Table I shows that a blend containing 10% of the Additive of Example 11 (5% MgSO$_4$-95% Al$_2$O$_3$) has an SO$_x$ Index of 38. This compares with an SO$_x$ Index of 58 for a blend containing 10% of the Additive of Example 12 (10% MgSO$_4$-90% Al$_2$O$_3$) (Item K of Table I). This shows that increasing the concentration of MgSO$_4$, in a spray-dried solid product of MgSO$_4$ and Al$_2$O$_3$, increases the SO$_x$ Index, and hence the ability to reduce SO$_x$ emissions.

Item L of Table I shows that a blend containing 10% of the Additive of Example 13 (4.9% MgO, ex-nitrate, on Al$_2$O$_3$) has an SO$_x$ Index of 26. This compares with an SO$_x$ Index of 38 for a blend containing 10% of the Additive of Example II (5% MgSO$_4$-95% Al$_2$O$_3$) (Item J of Table I). This shows that MgSO$_4$, in a spray-dried solid product of MgSO$_4$ and Al$_2$O$_3$, is more effective than MgO on Al$_2$O$_3$, in reducing SO$_x$ emissions.

Item M of Table I shows that a blend containing 10% of the Additive of Example 14 (10% MgO, ex-nitrate on Al$_2$O$_3$) has an SO$_x$ Index of 36. Item N of Table I shows that a blend containing 10% of the Additive of Example 15 (10% MgO, ex-chloride, on Al$_2$O$_3$) has an SO$_x$ Index of 37. This shows that MgO's, from two different sources, on Al$_2$O$_3$, have similar SO$_x$ Indices. These indices compare with an SO$_x$ Index of 58 for a blend containing 10% of the Additive of Example 3 (10% MgSO$_4$ on Al$_2$O$_3$) (Item G of Table I). They also compare with a SO$_x$ Index of 58 for a blend containing 10% of the Additive of Example 12 (10% MgSO$_4$-90% Al$_2$O$_3$) (Item K of Table I). These comparisons show that combinations of MgSO$_4$ and Al$_2$O$_3$ are more effective than combinations of MgO and Al$_2$O$_3$ in reducing SO$_x$ emissions.

Item O of Table I shows that a blend containing 10% of the Additive of Example 16 (20% MgO, ex-chloride, on Al$_2$O$_3$) has an SO$_x$ Index of 29. Compared to Items M and N of Table I, this shows that an increase in the concentration of MgO, from 10% to 20%, causes a decrease in the SO$_x$ Index. This contrasts with MgSO$_4$, where an increase in MgSO$_4$ concentration from 10% to 25% and 35%, caused an increase in the SO$_x$ Index (Items D through I of Table I).

Item P of Table I shows that a blend containing 10% of the Additive of Example 17 (Magchem 40, 98% MgO) has and SO$_x$ Index of zero. This compares with an SO$_x$ Index of 49 for a blend containing 1.25% of the Additive of Example 2 (100% MgSO$_4$) (Item C of Table I). This shows that pure MgSO$_4$ is effective in reducing SO$_x$ emissions, while pure MgO is not effective.

In this example (Example 20), we have compared MgSO$_4$ with MgO on a same percentage basis, e.g., 10% MgSO$_4$ on Al$_2$O$_3$ was compared with 10% MgO on Al$_2$O$_3$. It should be pointed out the MgSO$_4$ contains less magnesium than MgO. For example, 10% MgSO$_4$ is equivalent to 3.3% MgO, when expressed as MgO. Therefore, in all comparisions, the superiority of MgSO$_4$ would have been even greater if the comparisons had been made on an equivalent magnesium basis.

Item A of Table II shows that a blend containing 5% of the Additive of Example 4 (25% MgSO$_4$ on Al$_2$O$_3$), which was prepared by drying at 250° F. after each of the two impregnations, has an SO$_x$ Index of 49. Item B of Table II shows that a blend contaiig 5% of the Additive of Example 9 (25% MgSO$_4$ on Al$_2$O$_3$), which was prepared by calcination at 1250° F. after each of the two impregnations, has an SO$_x$ Index of 48. This shows that the effectiveness of the Additive is independent of the drying/calcination temperature used after each of the two impregnations. Similarly, items C and D of Table II show the same thing for additive concentrations of 10% in the blend.

TABLE II

| | | Effect of Drying/Calcination Temperature after Each Impregnation | | | |
| | | Blend Composition | | | |
| Item | Drying/ Calcination Temp. | Additive | Cracking Catalyst | Combustion Promoter | SOx Index |
|---|---|---|---|---|---|
| A | 250° F. | 5% Additive of Ex. 4 (25% MgSO$_4$ on Al$_2$O$_3$) | 94.63% DA-250 | 0.37% CP-3 | 49 |
| B | 1250° F. | 5% Additive of Ex. 9 (25% MgSO$_4$ on Al$_2$O$_3$) | 94.63% DA-250 | 0.37% CP-3 | 48 |
| C | 250° F. | 10% Additive of Ex. 4 (25% MgSO$_4$ on Al$_2$O$_3$) | 89.63% DA-250 | 0.37% CP-3 | above 90 |
| D | 1250° F. | 10% Additive of Ex. 9 (25% MgSO$_4$ on Al$_2$O$_3$) | 89.63% DA-250 | 0.37% CP-3 | above 90 |

EXAMPLE 21

A blend composition similar to Item H of Table I, namely 10% Additive of Example 9 (25% MgSO$_4$ on Al$_2$O$_3$), 89.63% DA-250 and 0.37% CP-3, was steam deactivated at 1350° F., 100% steam, 15 psig, for 8 hours. This steam-deactivated blend had an SO$_x$ Index of greater than 90. This blend was charged to a cyclic fixed-fluid-bed pilot cracking unit. In this unit. the blend was aged by subjecting it to 20 cycles of gas oil cracking followed by steam-stripping and then regeneration of the cracking catalyst by burning-off the coke deposit with air. The pilot unit aging conditions were:

| | |
|---|---|
| Reactor Temp. = | 950° F. |
| Regenerator Temp. = | 1250° F. |
| Gas Oil Feed = | Sohio Heavy Gas Oil |
| WHSV = | 40 |
| C/O = | 2.5 |

After 20 cycles of aging, the blend was discharged from the pilot unit and tested for $SO_x$ capability in our laboratory $SO_x$ test. The discharged, aged blend gave an $SO_x$ Index of greater than 90, the same as was obtained for the blend before aging. This shows that the Additive of Examle 9 (25% $MgSO_4$ on $Al_2O_3$) is stable to repeated cracking-regeneration cycles.

EXAMPLE 22

The three blends listed in Table III were steam-deactivated at 1500° F., 100% steam, 0 psig, for 5 hours in a fluid bed. The cracking activities of the three steam-deactivated blends were determined in the standard Micro-Activity Test. The results, given in Table III, show that the presence of 10% of the Additive of Example 4 (25% $MgSO_4$ on $Al_2O_3$) (dried at 250° F.), and 10% of the Additive of Example 9 (25% $MgSO_4$ on $Al_2O_3$) (calcined at 1250° F.), do not affect the activity of the cracking catalyst for cracking gas oil. These additives also do not affect the gas and coke selectivities as shown by the Gas and Carbon Factors in Table III.

TABLE III

Effect of Additive on Cracking Activity and Gas and Coke Selectivities
Blends Steam Deactivated at 1500° F., 100% steam, 0 psig, 5 hrs., fluid bed

| | Blend Compositions | | |
|---|---|---|---|
| Additive: | None | 10% Additive of Ex. 4[1] (25% $MgSO_4$ on $Al_2O_3$) | 10% Additive of Ex. 9[2] (25% $MgSO_4$ on $Al_2O_3$) |
| Cracking Catalyst: | 99.63% DA-250 | 89.63% DA-250 | 89.63% DA-250 |
| Combustion Promoter: | 0.37% CP-3 | 0.37% CP-3 | 0.37% CP-3 |
| M-A: V % Conv. | 71 | 70 | 72 |
| Gas Factor | 2.0 | 2.2 | 1.9 |
| Carbon Factor | 1.0 | 1.2 | 1.0 |

[1] Dried at 250° F. after each impregnation.
[2] Calcined at 1,250° F. after each impregnation.

EXAMPLE 23

Item A of Table I shows that a blend, which does not contain any additive, has an $SO_x$ Index of 10. Item Q of Table I shows that a blend which contains 2% of the Additive of Example 18 (100% $CaSO_4 \cdot 2H_2O$ as $CaSO_4$) has an $SO_x$ Index of 17. This shows that $CaSO_4$ is effective in reducing $SO_x$ emissions.

EXAMPLE 24

Item A of Table I shows that a blend, which does not contain any additive, has an $SO_x$ Index of 10. Item R of Table I shows that a blend which contains 2% of the Additive of Example 18-2 (100% $BaSO_4$) has an $SO_x$ Index of 17. This shows that $BaSO_4$ is effective in reducing $SO_x$ emissions.

EXAMPLE 25

Item H of Table I shows that a blend containing 10% of the additive of Example 9 (25% $MgSO_4$ on $Al_2O_3$) has an $SO_x$ Index of greater than 90. The actual $SO_x$ Index, in this case, was 112. This was at a regenerator temperature of 1250° F.

$SO_x$ Indices for this blend were also determined at regenerator temperatures of 1350° F. and 1450° F. The results, given in Table IV, show that the $SO_x$ Index decreases with increasing regenerator temperture.

TABLE IV

| Regenerator Temperature (°F.) | $SO_x$ Index |
|---|---|
| 1250 | 112 |
| 1350 | 64 |
| 1450 | 30 |

The above examples clearly indicate that effective, economical $SO_x$ control agents may be obtained using the teaching of our invention.

We claim:

1. A method for preparing a sulfur oxide gettering agent which comprises reacting a Groupo IIA metal sulfate under reducing and hydrolyzing conditions at elevated temperature to remove original sulfur from said sulfate and to establish acceptor sites for sulfur oxide molecules.

2. The method of claim 1 wherein said Group IIA metal sulfate is magnesium sulfate.

3. The method of claim 1 wherein said Group IIA metal sulfate is combined with an oxidation catalyst.

4. The method of claim 3 wherein said oxidation catalyst is platinum.

5. The method of claim 1 wherein said gettering agent is mixed with a hydrocarbon cracking catalyst.

6. The method of claim 5 wherein said mixture is reacted under reducing and hydrolyzing conditions in a catalytic cracking unit.

7. The method of claim 6 wherein the reducing and hydrolyzing step is conducted in a reactor-steam stripping zone of a catalytic cracking unit.

* * * * *